A. SCHERBIUS.
SYSTEM OF CONTROL FOR INDUCTION MOTORS.
APPLICATION FILED JUNE 27, 1908.
1,059,771.
Patented Apr. 22, 1913.
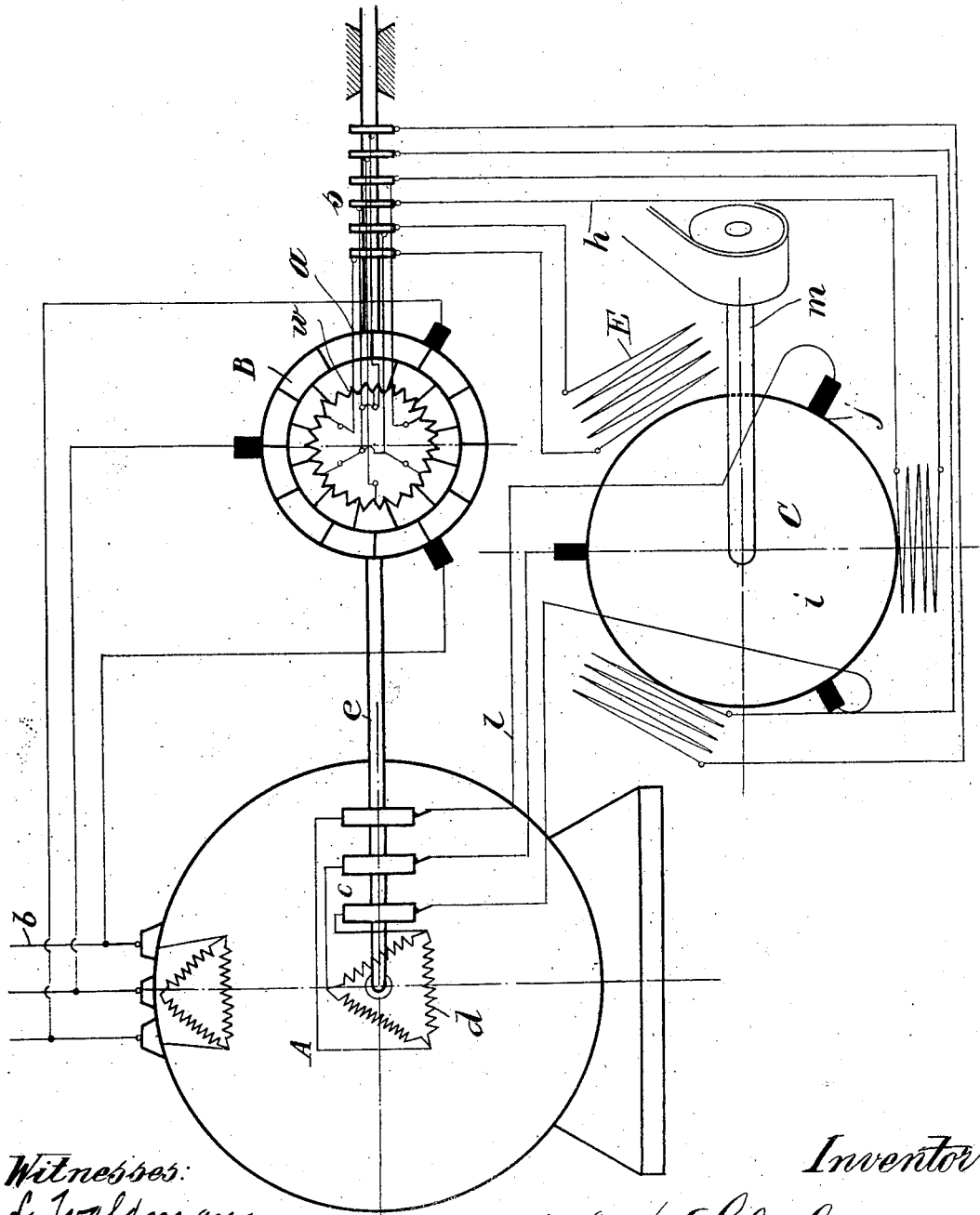
Witnesses:
L. Waldman
C. Hymann
Inventor
Arthur Scherbius.
by B. Singer Attorney.

UNITED STATES PATENT OFFICE.

ARTHUR SCHERBIUS, OF BADEN, SWITZERLAND.

SYSTEM OF CONTROL FOR INDUCTION-MOTORS.

1,059,771.  Specification of Letters Patent.  Patented Apr. 22, 1913.

Application filed June 27, 1908. Serial No. 440,695.

*To all whom it may concern:*

Be it known that I, ARTHUR SCHERBIUS, a citizen of the Swiss Confederation, and resident of Baden, Switzerland, have invented a certain new and useful System of Control for Induction-Motors, of which the following is a specification.

This invention relates to the control of alternating current machines. It has been proposed for this purpose to provide the rotor of asynchronous machines with a commutator, the different segments of which are connected by resistances, and to introduce into this commutator currents having voltages proportional to the line voltage, or currents proportional to the line current. These machines have the drawback that the commutator increases the cost of construction, leads to sparking, and operation is easily affected by such accidental conditions as variations of friction of the brushes upon the commutator.

According to the present invention, the commutator is separate from the asynchronous machine, and is carried upon it rotor shaft distinct from the rotor of the motor. The segments of the commutator are connected to the field windings of a separately driven commutator generator, the brushes of which are connected to the slip rings of the asynchronous machine. The brushes which co-act with the commutator of the rotor shaft are supplied with current at voltage proportionate to the line voltage, and of the same frequency. The result, assuming the rotor of the asynchronous machine to be revolving at a certain speed, is that the commutator will rotate synchronously therewith, and will therefore feed into the field windings of the commutator generator current of the same frequency as the frequency of the slip current generated in the rotor of the asynchronous machine. There will therefore be produced in the armature of the commutator generator current of slip frequency, and of voltage dependent upon the speed of this generator, which voltage can be used for regulation of the asynchronous machine. Thus, if its value be less than that of the slip voltage, the latter will have a positive value, and the asynchronous machine will run below synchronism. If its value is equal to the slip voltage, the machine will run synchronously; and if its value is greater than the slip voltage, the asynchronous machine will run above synchronism, that is, as a generator.

In Figure 1 is diagrammatically shown an embodiment of this invention.

A is an asynchronous three-phase machine. Connected to three phase mains $b$, it has field windings $d$ and slip rings $c$. The rotor and slip rings are mounted upon a shaft $e$, which carries a commutator B, the segments of which are connected by leads $a$ to slip rings $s$, and are interconnected by resistances $w$. Brushes $g$ connected by leads $f$ to the mains $b$ bear upon the commutator. The slip rings $s$ are connected by leads $h$ to the exciting winding E of a commutator generator C, the armature of which, $i$, is connected to a shaft $m$, which may be driven. Brushes $j$ and leads $l$ connect the armature $i$ to the slip rings $c$.

The operation is as follows:—Suppose the machine A running as a motor. A certain current, that is, the slip current, having a certain frequency and voltage, that is, the slip value, will be generated in the rotor of the machine A. At the same time, since the commutator B is also mounted on the shaft $e$, the current supplied by the brushes $g$ will be converted by the commutation from line frequency at these brushes, to slip frequency at the slip rings $s$. Hence the machine C will be excited by currents of the same frequency as the frequency in the rotor of A, and being a commutator generator, will supply at its brushes $j$ current still at the same frequency, independently of the speed at which the armature $i$ is driven. The voltage of the current thus produced by C can be varied by changing the speed of the shaft $m$. Suppose, however, that it is desired to control the speed of the shaft $e$, that is, the speed of the machine A. If the voltage of the current given out by C is increased, the slip voltage also increases and so the slip must increase and therefore the speed gradually decreases. Eventually the slip becomes nil, that is, when the voltage from C wholly neutralizes the voltage generated in the rotor of the machine, and the machine runs synchronously. By now increasing the voltage generated by C the machine can be caused to run above synchronism. If it is driven externally beyond its synchronous speed then like every asynchronous machine it can also run as a generator.

It will be understood that the function of B is to insure obtaining of a voltage used for opposing the rotor voltage of the asynchronous machine of the same frequency as the current in the rotor, whatever the speed of the machine. The function of the machine C is to allow the production of the desired value of voltage, without alteration of the frequency.

I claim—

1. In dynamo electric machinery in combination, an induction machine including a rotor and a stator with windings thereon, a commutator machine including a rotor and a stator, with windings on said stator, a commutator with windings in connection therewith and brushes adapted to bear on the surface of said commutator, a mechanical connection between the rotor of the induction machine and the commutator, electrical connections from the rotor of the commutator to the stator of the commutator machine and from the brushes of the commutator to the stator of the induction machine; and further electrical connections between the rotor of the commutator machine and the rotor of the induction machine as set forth.

2. In combination, polyphase leads, an asynchronous machine, field windings on said machine, connected to aforesaid leads, a wound rotor on said machine, slip rings connected to the windings of said rotor, a shaft extending from said rotor, a commutator mounted thereon, slip rings on said shaft, connected to the segments of aforesaid commutator, brushes co-acting with said segments, and supplied with a voltage proportional to the voltage of aforesaid mains, a commutator machine, exciting windings on said machine, connections from said windings to the slip rings of said commutator, a commutator on said commutator machine, brushes co-acting therewith, and connections from said brushes to the slip rings of the asynchronous machine, as set forth.

3. In dynamo electric machinery in combination an induction machine including a fixed and movable part a commutator machine also including a fixed and movable part together with a frequency converter comprising a commutator and brushes, said commutator and brushes being relatively movable, a mechanical connection between the movable parts of the induction machine and the frequency converter and electrical connections between the fixed part of the commutator machine and one part of the said converter, electrical connections between the other part of the converter and one part of the induction machine and further electrical connections between the other part of said commutator machine and the other part of the induction machine; as set forth.

4. In dynamo electric machinery in combination an induction machine including a fixed and movable part a commutator machine also including a fixed and movable part together with a frequency converter comprising a commutator and brushes, said commutator and brushes being relatively movable, a mechanical connection between the movable parts of the induction machine and the frequency converter and electrical connections between the fixed part of the commutator machine and one part of the said converter, electrical connections between the other part of the converter and the fixed part of the induction machine and further electrical connections between the movable part of said commutator machine and the movable part of the induction machine; as set forth.

5. In dynamo electric alternating current machinery in combination polyphase leads, a stator, a rotor, field windings on said stator, electrical connections between said field windings and aforesaid leads, windings on said rotor, slip rings, electrical connections between said slip rings and said rotor windings, a commutator, further slip rings, mechanical connection between said commutator, said rotor and said further slip rings, windings on said shaft, electrical connections between said windings and the segments of said commutator, brushes bearing on said commutator, a further stator, exciting windings therefor, electrical connections between said windings and aforesaid further slip rings, a further rotor, a further commutator, further brushes bearing thereon and electrical connections from said further brushes to the slip rings of the first named rotor; as set forth.

In testimony whereof I have hereunto set my hand in presence of two witnesses.

ARTHUR SCHERBIUS.

Witnesses:
  GEO. C. LEBER,
  A. LIEBERKNECHT.